United States Patent
Fujii

[15] 3,682,529
[45] Aug. 8, 1972

[54] WIDE ANGLE PHOTOGRAPHIC OBJECTIVE OF THE RETROFOCUS TYPE

[72] Inventor: Toru Fujii, Tokyo, Japan

[73] Assignee: Olympus Optical Co. Ltd., Tokyo, Japan

[22] Filed: Jan. 20, 1971

[21] Appl. No.: 107,948

[30] Foreign Application Priority Data

Jan. 23, 1970  Japan ..................... 45/5856

[52] U.S. Cl. ............................................... 350/215
[51] Int. Cl. .......................... G02b 9/62, G02b 13/04
[58] Field of Search ............................. 350/214, 215

[56] References Cited

UNITED STATES PATENTS 2,959,100  11/1960  Lautenbacher............ 350/215
2,844,997  7/1958   Lange.................... 350/215 X

*Primary Examiner*—John K. Corbin
*Attorney*—Kurt Kelman

[57] ABSTRACT

The wide angle photographic objective of the retrofocus type has the back focus of 0.9 to 1.25 times the focal length of the objective while it has the angle of field of 63° and the relative aperture of F2.8. The objective consists of six lens components the first component of which is a negative meniscus, while each of the second to fourth components is a positive lens element and the fifth component is a negative concavo-concave lens element, the sixth component consisting of two lens elements cemented to each other with the cemented surfaces being convex toward the object, the sixth component having a positive refractive power as a whole. In order to compensate for the aberrations, the objective satisfies the following conditions:

$$0.5\ f_1 < f_2 < 5.0\ f_1$$

$$0.25f < d_2$$

$$0.15f < d_3 < 0.3f$$

$$0.5f < r_8 < 2.5f$$

$$d_8 + d_{10} < 0.2f$$

$$n_6 - n_7 < 0.05$$

where $f$ is the focal length of the objective and $f_1$, $f_2$ are the focal length each of the first and second components, $d_2$ being the air gap between the first and second components, $d_3$ being the thickness of the second component, $r_8$ being the radius of curvature of the rear surface of the fourth component, $d_8$ and $d_{10}$ being the air gaps each between the fourth and fifth components and between the fifth and sixth components, $n_6$ and $n_7$ being the refractive index ($d$-line) of the front and rear lens elements of the six component.

2 Claims, 3 Drawing Figures

WIDE ANGLE PHOTOGRAPHIC OBJECTIVE OF THE RETROFOCUS TYPE

BACKGROUND OF THE INVENTION

The present invention relates to a wide angle photographic objective of the retrofocus type and, more particularly, to a wide angle photographic objective of the retrofocus type having the relative aperture of F2.8 and the angle of field of 63° with the aberrations such as the spherical aberration, coma and the distortion and the like inherent to a conventional retrofocus objective being extremely compensated for over the entire field of view so that a high resolving power is obtained while the back focus of the objective is kept sufficiently great.

In a single lens reflex camera, a long back focus is required for the objective to be incorporated in the camera due to the requirements in the mechanical construction of the camera.

When the focal length of a photographic objective of the conventional type is made small, the back focus of the objective is made necessarily small so that it can not be incorporated in the single lens reflex camera.

A retrofocus type objective has been developed so as to solve the above described difficulty. However, the prior art retrofocus type objective suffers the flare occurring in the fully opened diaphragm aperture, because the spherical aberration and the coma generated by the concave lens element of high refracting power generally located at the front side of the objective can not be fully compensated for by the lens system located at the rear side of the objective.

The present invention aims at avoiding the above described disadvantage of the prior art retrofocus type objective.

SUMMARY OF THE INVENTION

The object of the present invention is to provide a novel and useful wide angle photographic objective of the retrofocus type which avoids the above described disadvantages of the prior art retrofocus type objective and which has a large relative aperture and a wide angle of field while the back focus of the objective is kept sufficiently great with the aberration being extremely compensated for over the entire field of view so that a high resolving power is obtained.

The above object is achieved in accordance with the present invention by providing an objective having the relative aperture of F2.8 and the angle of field of 63° and consisting of six lens components, the first component of which facing to the object consists of a negative meniscus, while each of the second to fourth components consists of a positive lens element and the fifth component is a negative concavo-concave lens element, the sixth component consisting of two lens elements cemented to each other with the cemented surfaces thereof being convex toward the object while the cemented lens elements have a positive refractive power as a whole, the back focus of the entire system being 0.9 to 1.25 times the focal length of the entire system, the objective being characterized by satisfying the following conditions:

$$0.5\,|f_1|<f_2<5.0\,|f_1|$$

$$0.25f<d_2$$

$$0.15f<d_3<0.3f$$

$$0.5f<|r_8|<2.5f$$

$$d_8+d_{10}<0.2f$$

$$|n_6-n_7|>0.05$$

where:
$f$ = focal length of the entire system
$f_i$ ($i = 1, 2, -$) = focal length of the respective lens element beginning at the object side
$r_i$ ($i = 1, 2, -$) = radius of curvature of the surfaces of the respective lens elements beginning at the object side
$d_i$ ($i = 1, 2, -$) = thickness of the respective lens element and the air gap between the adjacent lens elements beginning at the object side
$n_i$ ($i = 1, 2, -$) = refractive index of the glass of the respective lens element with respect to $d$-line beginning at the object side
$\nu_i$ ($i = 1, 2, -$) = Abbe number of the glass of the respective lens element beginning at the object side By satisfying the above conditions, a high quality retrofocus type objective is obtained.

If the diverging power of the first component is made great, the marginal light quantity in the peripheral zone of the field of view is increased and the back focus is made long. However, if the diverging power is too great, the spherical aberration, the coma, the chromatic aberration of magnification and the like rapidly increase. Thus, when the spherical aberration is compensated for by the lens system located rearwardly of the first component near the diaphragm of the objective, the non-axial aberrations such as the curvature of field are increased. Therefore, the compensation must be effected by a lens system located adjacent to the first component. However, when the compensating lens system is located too close to the first component, the back focus is necessarily made short and the compensation for the coma is made difficult. Thus, the air gap $d_2$ between the first component and the succeeding second component must be kept in the range of $d_2 > 0.25f$.

Under such conditions, the spherical aberration can be extremely effectively compensated for by the second component. However, the coma is newly generated by the second component thereby deteriorating the quality of the objective. In order to avoid the above defect, the relationship between the refractive power of the first component and that of the second component must be kept as follows:

$$0.5\,|f_1|<f_2<5.0\,|f_1|$$

By satisfying the above conditions, the spherical aberration as well as the coma can be appropriately compensated for.

When the thickness $d_3$ of the second component is made too small, the non-axial astigmatism is made great. Therefore, the thickness $d_3$ must satisfy the following conditions:

$$0.15f < d_3 < 0.3f$$

The rear surface of the fourth component is effective for compensating for the non-axial astigmatism. However, when the radius of curvature of the rear surface of the fourth component is made too small, the coma, particularly the chromatic coma, is remarkably increased. On the other hand, when the radius of curvature of the rear surface of the fourth component is made too great, the astigmatism is remarkably increased. In order to suppress the generation of the coma and the astigmatism, the radius of curvature $r_8$ of the rear surface of the fourth component must satisfy the following conditions:

$$0.5f < |r_8| < 2.5f.$$

The generation of the coma is suppressed while the marginal light quantity is increased as the air gaps $d_8$ and $d_{10}$ are made small. Thus, the air gaps $d_8$ and $d_{10}$ are required to satisfy the following condition:

$$d_8 + d_{10} < 0.2f$$

The fourth to sixth components inclusive form the so-called Tessar type lens system. Therefore, the non-axial astigmatism is effectively compensated for by increasing the difference $(n_6 - n_7)$ between the refractive index of the front lens element of the sixth lens components and that of the rear lens element thereof. Thus, the difference $(n_6 - n_7)$ is required to satisfy the following condition:

$$|n_6 - n_7| > 0.05$$

Now, the preferred embodiments of the present invention will be described with reference to the accompanying drawings illustrating the same.

DETAILED DESCRIPTION OF THE PREFERRED EMBODIMENTS

Figure 1:
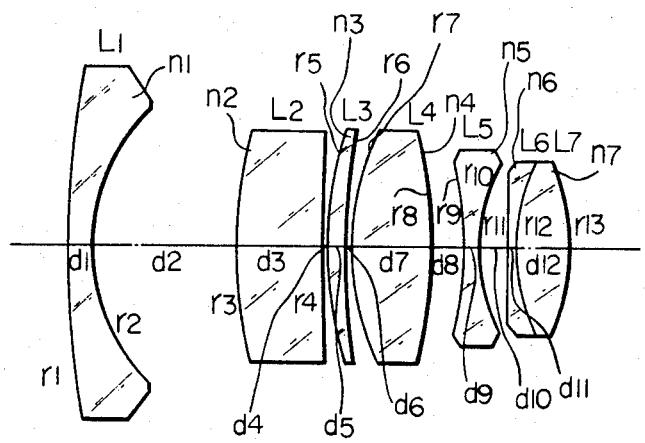
FIG. 1 is a longitudinal sectional view showing the arrangement of the lens components of the embodiment of the retrofocus type objective of the present invention.

Referring to FIG. 1, the first to fifth lens components are shown by $L_1$ to $L_5$, respectively, while the sixth component is shown as being constituted by lens elements $L_6$ and $L_7$ cemented to each other. The reference symbols $r$, $d$, $n$ with suffixes shown are already referred to in the previous description together with symbols $f$ and $v$ with suffixes.

EXAMPLE I $f = 100$   Angle of field $2w = 63°$   Relative aperture $= 1:2.8$

| | | | | | | | |
|---|---|---|---|---|---|---|---|
| $r_1$ | 156.014 | $d_1$ | 5.276 | $n_1$ | 1.56883 | $v_1$ | 56.0 |
| $r_2$ | 44.446 | $d_2$ | 35.939 | $n_2$ | 1.61272 | $v_2$ | 58.6 |
| $r_3$ | 132.405 | $d_3$ | 23.430 | $n_3$ | 1.60717 | $v_3$ | 40.3 |
| $r_4$ | 525.813 | $d_4$ | 0.567 | $n_4$ | 1.62299 | $v_4$ | 58.1 |
| $r_5$ | 95.025 | $d_5$ | 5.560 | $n_5$ | 1.66998 | $v_5$ | 39.3 |
| $r_6$ | 215.930 | $d_6$ | 0.425 | $n_6$ | 1.58144 | $v_6$ | 40.7 |
| $r_7$ | 68.409 | $d_7$ | 21.076 | $n_7$ | 1.6516 | $v_7$ | 58.5 |
| $r_8$ | −99.887 | $d_8$ | 6.666 | | | | |
| $r_9$ | −69.351 | $d_9$ | 2.496 | | | | |
| $r_{10}$ | 46.690 | $d_{10}$ | 6.808 | | | | |
| $r_{11}$ | 1005.378 | $d_{11}$ | 2.496 | | | | |
| $r_{12}$ | 42.055 | $d_{12}$ | 12.765 | | | | |
| $r_{13}$ | −56.691 | | | | | | |

EXAMPLE II $f = 100$   Angle of field $2w = 63°$   Relative aperture $= 1:2.8$

| | | | | | | | |
|---|---|---|---|---|---|---|---|
| $r_1$ | 252.639 | $d_1$ | 5.111 | $n_1$ | 1.56883 | $v_1$ | 56.0 |
| $r_2$ | 45.028 | $d_2$ | 35.778 | $n_2$ | 1.61772 | $v_2$ | 49.8 |
| $r_3$ | 128.350 | $d_3$ | 20.833 | $n_3$ | 1.60342 | $v_3$ | 38.0 |
| $r_4$ | 1299.453 | $d_4$ | 0.444 | $n_4$ | 1.62041 | $v_4$ | 60.2 |
| $r_5$ | 96.058 | $d_5$ | 5.556 | $n_5$ | 1.6727 | $v_5$ | 32.1 |
| $r_6$ | 225.911 | $d_6$ | 0.417 | $n_6$ | 1.58144 | $v_6$ | 40.7 |
| $r_7$ | 71.833 | $d_7$ | 19.917 | $n_7$ | 1.6516 | $v_7$ | 58.5 |
| $r_8$ | −107.814 | $d_8$ | 8.361 | | | | |
| $r_9$ | −69.322 | $d_9$ | 2.5 | | | | |
| $r_{10}$ | 52.258 | $d_{10}$ | 6.944 | | | | |
| $r_{11}$ | 740.983 | $d_{11}$ | 2.5 | | | | |
| $r_{12}$ | 218.769 | $d_{12}$ | 12.778 | | | | |
| $r_{13}$ | −56.236 | | | | | | |

Figure 2:
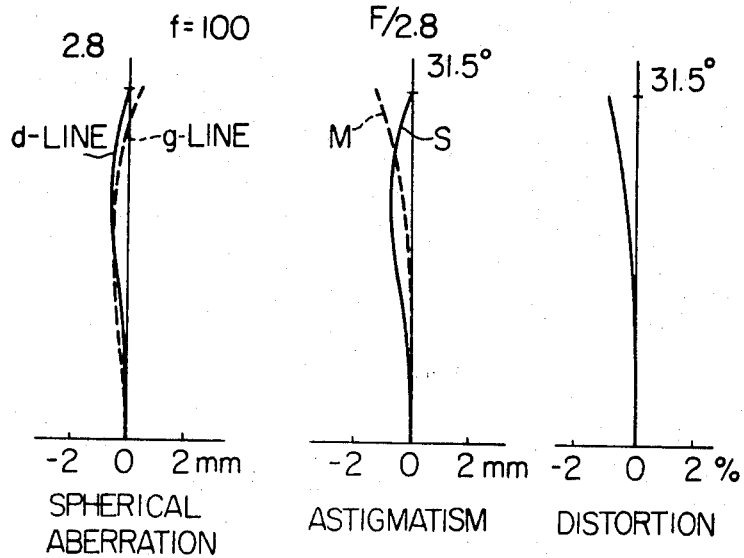
FIG. 2 shows various aberration curves of the embodiment of the present invention.
Figure 3:
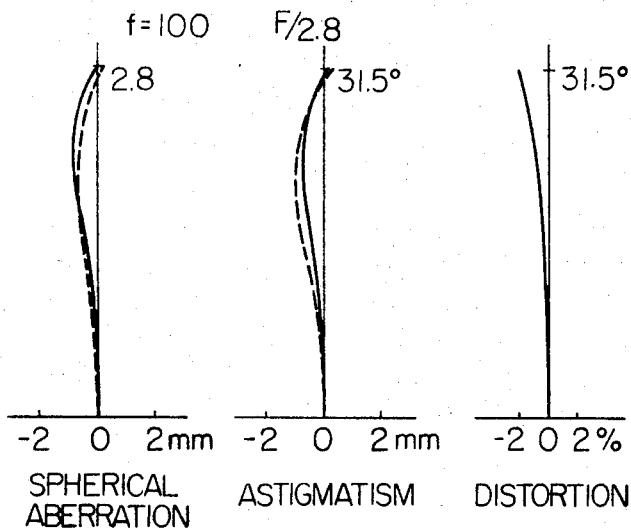
FIG. 3 shows various aberration curves of another embodiment of the present invention.

FIG. 2 shows the various aberration curves of example I while FIG. 3 shows the various aberration curves of example II.

It is apparent from the aberration curves shown in FIGS. 2 and 3 that the present invention provides a high quality wide angle photographic objective of the retrofocus type having sufficiently great back focus ranging 0.9 to 1.25 times the focal length of the objective.

I claim:

1. Wide angle photographic objective of the retrofocus type having six lens components, the first component of which facing to the object consists of a negative meniscus, while each of the second to fourth components consists of a positive lens element and the fifth component is of a negative concave-concave lens element, the sixth component consisting of two lens elements cemented to each other with the cemented surfaces thereof being convex toward the object while said cemented lens elements have a positive refractive power as a whole, the back focus of the entire system being 0.9 to 1.25 times the focal length f of the entire system, wherein the improvement comprises the fact that said objective satisfies the following conditions:

$$0.5 |f_1| < f_2 < 5.0 |f_1|$$

$$0.25f < d_2$$

$$0.15f < d_3 < 0.3f$$

$$0.5f < |r_8| < 2.5f$$

$$d_8 + d_{10} < 0.2f$$

$$|n_6 - n_7| < 0.05$$

where:

$f_i$ ($i = 1, 2$ —) = focal length of the respective lens element beginning at the object side.

$r_i$ ($i = 1, 2$ —) = radius of curvature of the surfaces of the respective lens elements beginning at the object side $d_i$ ($i = 1, 2$ —) = thickness of the respective lens element and the air gap between the lens elements beginning at the object side $n_i$ ($i = 1, 2$ —) = refractive index of the glass of the respective lens element with respect to $d$-line beginning at the object side $v_i$ ($i = 1, 2$ —) = Abbe number of the glass of the respective lens element beginning at the object side and the objective satisfying the following numerical data:

| | | | | | | | |
|---|---|---|---|---|---|---|---|
| $f = 100$ | angle of field $2w = 63°$ | | | Relative Aperture = 1:2.8 | | | |
| $r_1$ | 156.014 | $d_1$ | 5.276 | $n_1$ | 1.56883 | $\nu_1$ | 56.0 |
| $r_2$ | 44.446 | $d_2$ | 35.939 | $n_2$ | 1.61272 | $\nu_2$ | 58.6 |
| $r_3$ | 132.405 | $d_3$ | 23.430 | $n_3$ | 1.60717 | $\nu_3$ | 40.3 |
| $r_4$ | 525.813 | $d_4$ | 0.567 | $n_4$ | 1.62299 | $\nu_4$ | 58.1 |
| $r_5$ | 95.025 | $d_5$ | 5.560 | $n_5$ | 1.66998 | $\nu_5$ | 39.3 |
| $r_6$ | 215.930 | $d_6$ | 0.425 | $n_6$ | 1.58144 | $\nu_6$ | 40.7 |
| $r_7$ | 68.409 | $d_7$ | 21.076 | $n_7$ | 1.6516 | $\nu_7$ | 58.5 |
| $r_8$ | −99.887 | $d_8$ | 6.666 | | | | |
| $r_9$ | −69.351 | $d_9$ | 2.496 | | | | |
| $r_{10}$ | 46.690 | $d_{10}$ | 6.808 | | | | |
| $r_{11}$ | 1005.378 | $d_{11}$ | 2.496 | | | | |
| $r_{12}$ | 42.055 | $d_{12}$ | 12.765 | | | | |
| $r_{13}$ | −56.591 | | | | | | |

2. Wide angle photographic objective of the retrofocus type having six lens components, the first component of which facing to the object consists of a negative meniscus, while each of the second to fourth components consists of a positive lens element and the fifth component is of a negative concave-concave lens element, the sixth component consisting of two lens elements cemented to each other with the cemented surfaces thereof being convex toward the object while said cemented lens elements have a positive refractive power as a whole, the back focus of the entire system being 0.9 to 1.25 times the focal length $f$ of the entire system, wherein the improvement comprises the fact that said objective satisfies the following conditions:

$$0.5|f_1| < f_2 < 5.0|f_1|$$

$$0.25f < d_2$$

$$0.15f < d_3 < 0.3f$$

$$0.5f < |r_8| < 2.5f$$

$$d_8 + d_{10} < 0.2f$$

$$|n_6 - n_7| < 0.05$$

where:

$f_i$ ($i = 1,2—$) = focal length of the respective lens element beginning at the object side $r_i$ ($i = 1,2—$) = radius of curvature of the surfaces of the respective lens elements beginning at the object side $d_i$ ($i = 1,2—$) = thickness of the respective lens element and the air gap between the lens elements beginning at the object side $n_i$ ($i = 1,2—$) = refractive index of the glass of the respective lens element with respect to $d$-line beginning at the object side $\nu_i$ ($i = 1,2—$) = Abbe number of the glass of the respective lens element beginning at the object side and the objective satisfying the following numerical data:

| | | | | |
|---|---|---|---|---|
| $f = 100$ | angle of field $2w = 63°$ | | | relative aperture = 1:2.8 |
| $r_1$ | 252.639 | | | |
| $r_2$ | 45.028 | | | |
| $r_3$ | 128.350 | | | |
| $r_4$ | 1299.453 | | | |
| $r_5$ | 96.058 | | | |
| $r_6$ | 225.911 | | | |
| $r_7$ | 71.833 | | | |
| $r_8$ | −107.814 | $d_8$ | 8.361 | |
| $r_9$ | −69.322 | $d_9$ | 2.5 | |
| $r_{10}$ | 52.258 | $d_{10}$ | 6.944 | |
| $r_{11}$ | 740.983 | $d_{11}$ | 2.5 | |
| $r_{12}$ | 218.769 | $d_{12}$ | 12.778 | |
| $r_{13}$ | −56.236 | | | |

* * * * *